UNITED STATES PATENT OFFICE.

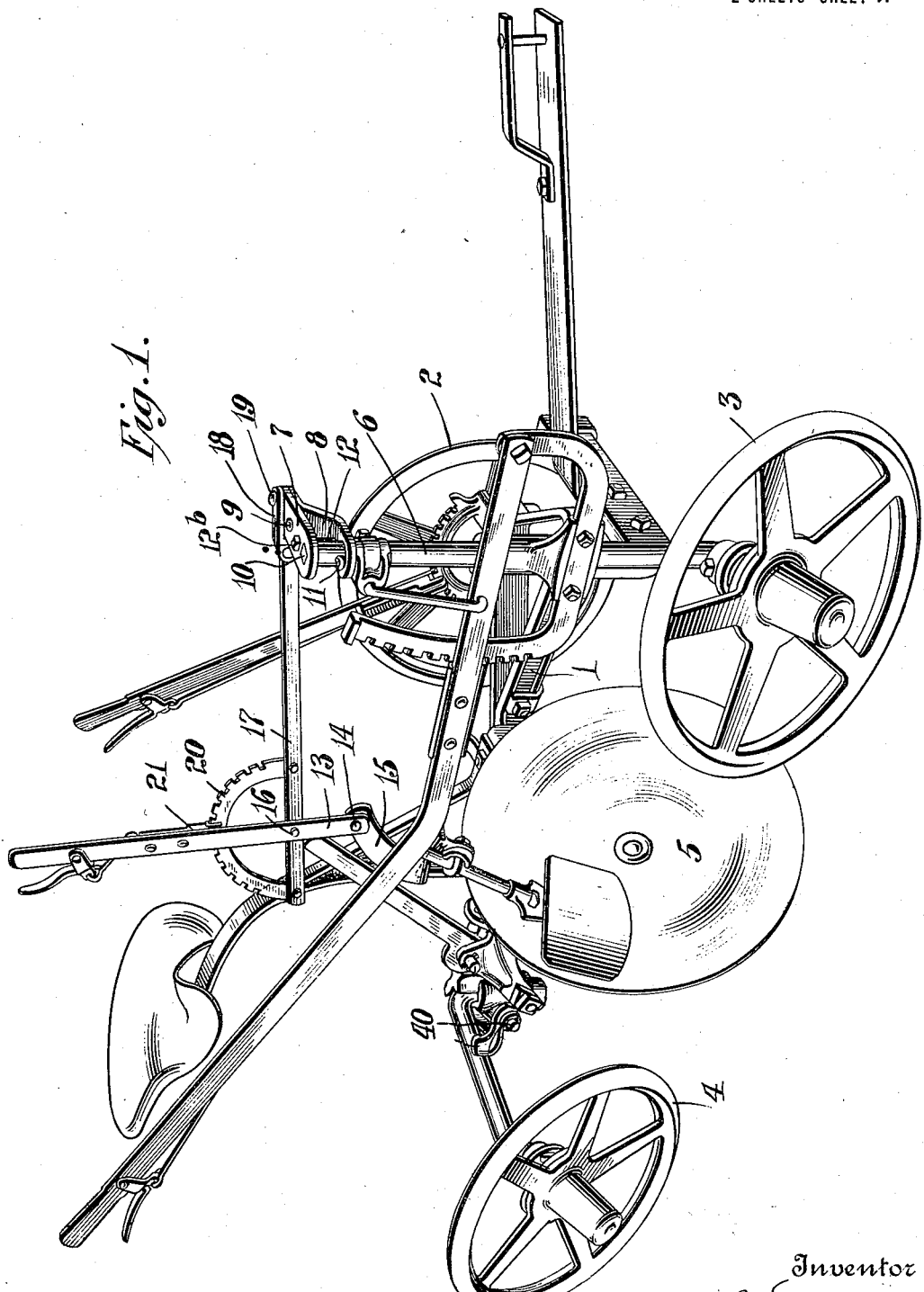

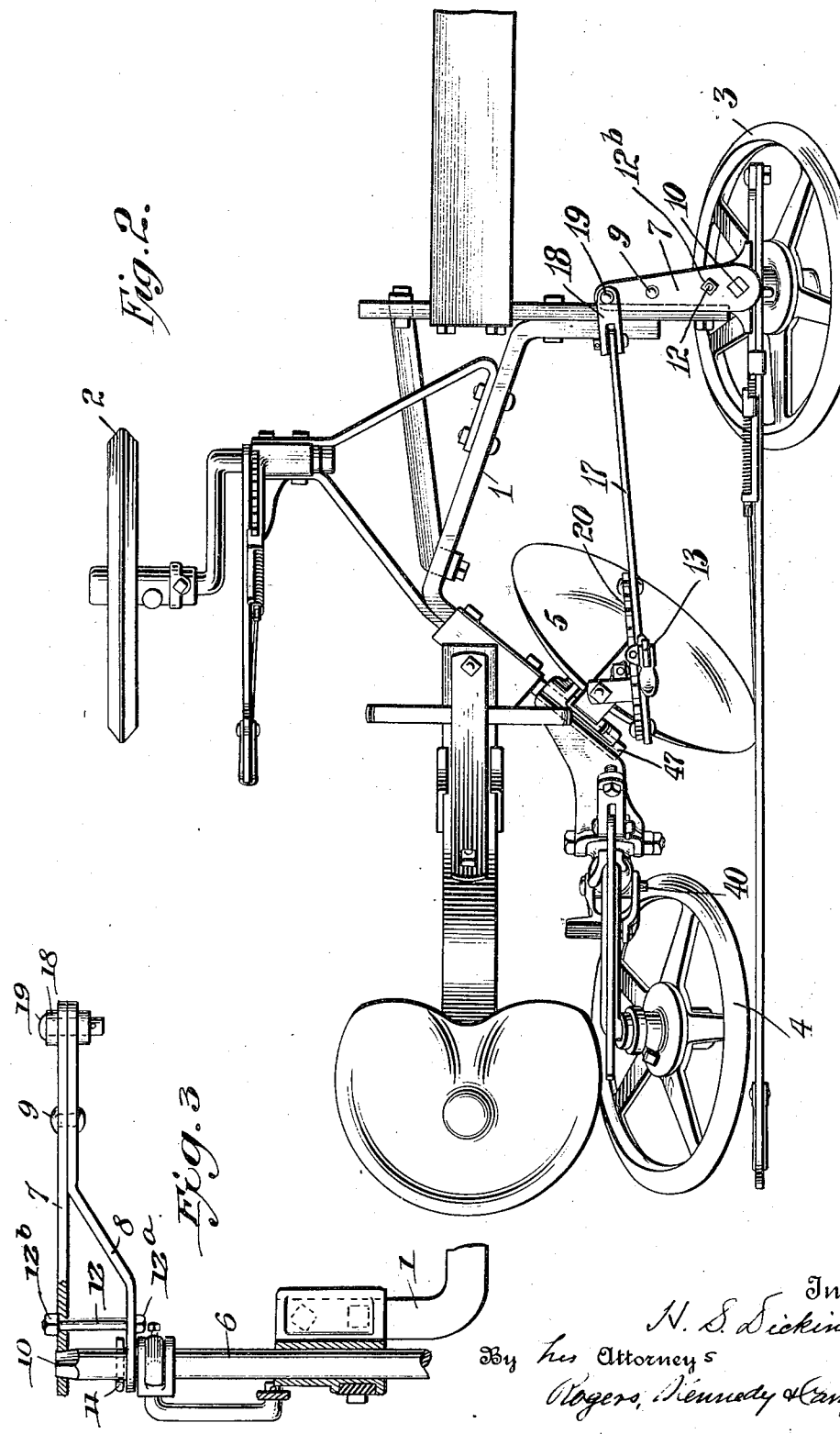

HARRY S. DICKINSON, OF MOLINE, ILLINOIS, ASSIGNOR TO MOLINE PLOW COMPANY, A CORPORATION OF ILLINOIS.

WHEELED PLOW.

1,269,166.      Specification of Letters Patent.      Patented June 11, 1918.

Application filed December 17, 1915, Serial No. 67,338. Renewed April 20, 1918. Serial No. 229,862.

*To all whom it may concern:*

Be it known that I, HARRY S. DICKINSON, a citizen of the United States, residing at Moline, in the county of Rock Island and State of Illinois, have invented certain new and useful Improvements in Wheeled Plows, of which the following is a specification, reference being had therein to the accompanying drawings.

This invention relates to agricultural implements, and consists of various improved features of construction applicable more particularly, but not necessarily limited to, wheel plows especially of the disk type.

My improvements are shown by way of example embodied in a single disk plow, the frame of which is supported on one side by a land wheel and on the other side by a front guiding furrow wheel and a rear trailing furrow wheel, which wheels are so mounted that their angular relation to the line of draft may be varied as usual to properly guide the machine.

My invention consists in an improved form and construction of guiding arm for controlling the movements of the front furrow wheel, which improvements will be fully pointed out in the specification to follow and the novel parts of which will be defined in the appended claims.

In the accompanying drawings:

Figure 1 is a perspective view of a wheel plow having my invention embodied therein.

Fig. 2 is a top plan view of the same.

Fig. 3 is a front elevation partly in section of the upper part of the front furrow wheel stem, and my improved guiding arm applied thereto.

Referring to the drawings:

The plow shown in the accompanying drawings and illustrating by way of example one form of embodiment of my improvements consists of a frame structure 1 supported at the land side by a land wheel 2 and at the furrow side by a front guiding furrow wheel 3 and a rear trailing furrow wheel 4, the frame giving support to a plowing device in the form of a disk 5, and giving support also to a driver's seat.

The front furrow wheel 3 is mounted on the lower downwardly inclined end of an upright furrow wheel stem 6 which stem is mounted in a suitable upright bearing fixed to the frame so that the stem may swivel therein, and thus angle the furrow wheel, that is, vary the angle of the same relative to the line of draft. It is usual to provide for the control of furrow wheels thus mounted, by the driver, so that he may turn and adjust the same to vary the angle of the wheel according to the conditions encountered in practice. To effect this action it is the custom to apply a guiding arm to the upper end of the wheel stem, which guiding arm is connected by a connecting rod to a controlling lever sustained by the frame within reach of the driver. Various forms of guiding arms have been devised for this purpose, consisting in many cases of forged or malleable or cast arms having set screws, bolts, or key-ways to prevent a rotative movement on the stem. In the use of such constructions the arm is apt to become loose by constant strain, and great difficulty and inconvenience are encountered in maintaining the arm in its proper fixed relation on the stem; and where set screws are employed for this purpose, the stem becomes badly cut where the screw engages the same and fails to longer hold the arm rigid thereon.

In accordance with my invention, I overcome these objections by providing a guiding arm of the form shown more particularly in Figs. 1, 2 and 3, where it will be seen that the arm consists of an upper member or arm proper in the form of a plate 7, which is engaged at its inner end with the upper end of the stem 6, and a strap 8 extending beneath the arm and engaged at its inner end with the stem and connected at its outer end with the arm as by the rivet 9. The plate 7 is engaged with the end of the wheel stem by the formation of a square tapered opening in the plate which seats over the squared tapered end 10 of the stem and interlocks therewith in such manner that when the arm is turned the stem will be compelled to turn with it. The inner end of the strap 8 is formed with an opening through which the stem extends and the stem has passed through it, a cotter pin 11, constituting in effect an abutment on the stem against the under side of which the inner end of the strap bears. A vertical bolt 12 extends upwardly through the strap and plate 7, near their inner ends, the head 12$^a$ of the bolt bearing against the under side of the strap, and the nut 12$^b$ bearing against the upper side of the plate, this bolt constituting in effect a tie member for holding the arm engaged with the stem which tie member will act when the nut is screwed up, to draw the plate 7 down tightly on and maintain its interlocked engagement with the end of the stem. The construction described constitutes a rigid guiding arm which is engaged with the stem in such manner as to form in effect a fixed part thereof, so that when the arm is turned or operated, the stem will be turned with it or swiveled in the frame, and will thus turn the wheel and vary the angle of the same relative to the line of draft. The arm is operated and controlled by the driver by means of a hand lever 13, pivoted at its lower end as at 14 to a bracket 15 on the frame of the machine, and connected between its ends as at 16 to the rear end of a fore and aft extending bar 17, the front end of which is jointed to a link 18 pivoted as at 19 to the outer end of the guiding arm. At its rear the bar is provided with a segment frame 20 having teeth engaged by a locking latch 21 on the lever.

By reason of the form and construction of the guiding arm as described, the strains to which the arm is subjected, are not applied so as to cause the parts to become loose, as such strains are received entirely by the upper squared end of the stem, and inasmuch as the tie bolt 12, receiving support indirectly from the stem through the medium of the abutment or cotter pin 11, holds the plate down on and engaged with the square end of the stem, there will be no liability of the parts becoming loose from constant use. Furthermore, the construction is economical in manufacture and simple and effective in its action.

It will be understood that while I have illustrated my improved guiding arm as applied to the front furrow wheel, it is manifest that it is not limited to such application, and may be employed with the same effects and advantages in connection with other wheels on other forms of plows, or wherever a guiding arm is required to control a wheel.

While in the foregoing description and accompanying drawings I have set forth my invention in the form which I prefer to adopt as regards its detailed embodiment, it will be understood that the details may be variously modified and changed without departing from the spirit of my invention; and further it will be understood that the invention is not limited to any particular form or construction of the parts except in so far as such limitations are specified in the claims.

Having thus described my invention, what I claim is:

1. In a plow, the combination of a frame, a ground wheel, a ground wheel support for the ground wheel mounted on the frame, and movable relatively thereto to angle the ground wheel, an operating arm detachably interlocked with the upper end of the ground wheel support to shift the same, and means receiving support from the ground wheel support and engaged with said arm, said means being operable to draw the arm down on the ground wheel support and maintain the same in interlocked engagement therewith.

2. In a plow, the combination of a frame, a ground wheel, a support for the ground wheel having an upright stem swiveled in the frame to angle the ground wheel, an operating arm engaged at its inner end with the stem to turn therewith, an abutment on the stem below the arm, a strap mounted at its inner end on the stem below the abutment and engaging the same, and connected at its outer end with the arm, a tie bolt connecting the arm and strap and acting to hold the arm engaged with the stem, and means for operating the arm.

3. In a plow, the combination of a frame, a ground wheel, a support for the same having an upright stem, an operating arm engaged at its inner end with the stem in fixed relation thereto to move with it, a strap sustained at its inner end by the stem against upward movement relatively thereto, and connected with the arm, a tie member engaging the strap and arm to hold the latter in engagement with the stem, and means for operating the arm.

4. In a plow, the combination of a frame, a ground wheel, a support for the ground wheel having an upright stem swiveled in the frame to angle the wheel and provided with a squared end, an operating arm having a square hole in its end to receive the squared end of the stem, an abutment on the stem below the arm, a strap provided at its inner end with an opening surrounding the stem below the abutment and engaging the latter, a tie bolt connecting the arm and strap together adjacent their inner ends, means connecting the arm and strap together beyond the tie bolt, and means for operating the arm to swivel the stem.

In testimony whereof I have affixed my signature.

HARRY S. DICKINSON.